(12) United States Patent  
Cheng

(10) Patent No.: US 9,177,380 B2  
(45) Date of Patent: Nov. 3, 2015

(54) 3D VIDEO CAMERA USING PLURAL LENSES AND SENSORS HAVING DIFFERENT RESOLUTIONS AND/OR QUALITIES

(75) Inventor: Kun-Nan Cheng, Hsinchu Hsien (TW)

(73) Assignee: MStar Semiconductor, Inc., Hsinchu Hsien (TW)

(*) Notice: Subject to any disclaimer, the term of this patent is extended or adjusted under 35 U.S.C. 154(b) by 509 days.

(21) Appl. No.: 13/190,658

(22) Filed: Jul. 26, 2011

(65) Prior Publication Data

US 2012/0268572 A1 Oct. 25, 2012

(30) Foreign Application Priority Data

Apr. 22, 2011 (TW) .............................. 100114159 A

(51) Int. Cl.
*H04N 13/02* (2006.01)
*G06T 7/00* (2006.01)
*H04N 13/00* (2006.01)

(52) U.S. Cl.
CPC .......... *G06T 7/0075* (2013.01); *H04N 13/0025* (2013.01); *H04N 13/025* (2013.01); *H04N 13/0239* (2013.01); *G06T 2207/20021* (2013.01); *H04N 2013/0081* (2013.01)

(58) Field of Classification Search
CPC ............ H04N 13/025; H04N 13/0239; H04N 2013/0081; G06T 7/0075; G06T 2207/20021
USPC .................. 348/47, 48, 49, 143, 51; 345/427; 704/231
See application file for complete search history.

(56) References Cited

U.S. PATENT DOCUMENTS

| | | | |
|---|---|---|---|
| 6,383,079 B1 | 5/2002 | Takeda et al. | |
| 6,847,392 B1 | 1/2005 | House | |
| 2001/0045979 A1* | 11/2001 | Matsumoto et al. | 348/43 |
| 2002/0105514 A1* | 8/2002 | Roche, Jr. | 345/419 |
| 2002/0191841 A1* | 12/2002 | Harman | 382/154 |
| 2004/0208357 A1* | 10/2004 | Tokuhashi et al. | 382/154 |
| 2006/0082574 A1* | 4/2006 | Tsubaki | 345/419 |
| 2007/0014347 A1* | 1/2007 | Prechtl et al. | 375/240.01 |
| 2007/0279415 A1* | 12/2007 | Sullivan et al. | 345/427 |
| 2009/0142041 A1 | 6/2009 | Nagasawa et al. | |
| 2009/0153649 A1* | 6/2009 | Hirooka et al. | 348/47 |
| 2009/0252423 A1 | 10/2009 | Zhu et al. | |
| 2010/0073463 A1* | 3/2010 | Momonoi et al. | 348/47 |
| 2010/0098328 A1* | 4/2010 | Se et al. | 382/154 |
| 2010/0239180 A1* | 9/2010 | Yea et al. | 382/261 |

(Continued)

FOREIGN PATENT DOCUMENTS

KR 100653965 B1 11/2006

OTHER PUBLICATIONS

TW Office Action issued Jul. 23, 2013, 11 pages.

(Continued)

*Primary Examiner* — Jay Patel
*Assistant Examiner* — Joseph Suh
(74) *Attorney, Agent, or Firm* — Edell, Shapiro & Finnan, LLC

(57) ABSTRACT

A 3D video camera is provided. The 3D video camera includes a first camera lens for providing a first sensing signal, a second camera lens for providing a second sensing signal, and an image processing unit for receiving the first sensing signal and the second sensing signal to generate a first eye image and a first comparison image to accordingly generate 3D depth information.

14 Claims, 11 Drawing Sheets

(56) References Cited

U.S. PATENT DOCUMENTS

| | | | |
|---|---|---|---|
| 2010/0302355 A1* | 12/2010 | Tamaru | 348/59 |
| 2010/0322477 A1* | 12/2010 | Schmitt et al. | 382/103 |
| 2011/0044531 A1 | 2/2011 | Zhang et al. | |
| 2011/0115909 A1* | 5/2011 | Sternberg et al. | 348/143 |
| 2011/0175983 A1* | 7/2011 | Park et al. | 348/46 |
| 2011/0205341 A1* | 8/2011 | Wilson et al. | 348/51 |
| 2011/0234762 A1* | 9/2011 | Huang | 348/47 |
| 2011/0254841 A1* | 10/2011 | Lim et al. | 345/421 |
| 2011/0254923 A1* | 10/2011 | Choi et al. | 348/46 |
| 2011/0286661 A1* | 11/2011 | Lee et al. | 382/154 |
| 2011/0304618 A1* | 12/2011 | Chen et al. | 345/420 |
| 2012/0007943 A1* | 1/2012 | Tytgat | 348/14.08 |
| 2012/0089392 A1* | 4/2012 | Larco et al. | 704/231 |

OTHER PUBLICATIONS

Taiwan Office Action dated Feb. 7, 2014, 7 pages.

* cited by examiner

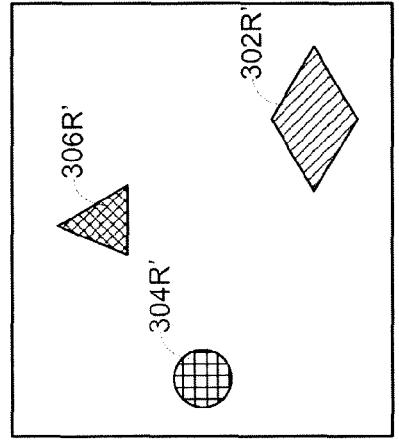
FIG. 6C
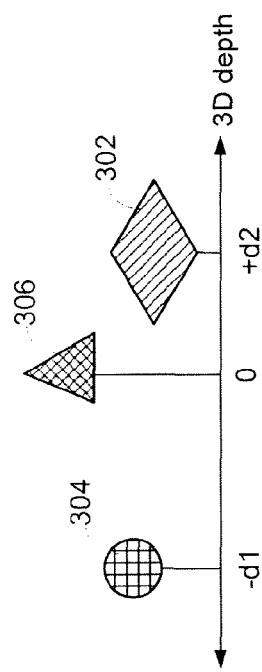
FIG. 6E
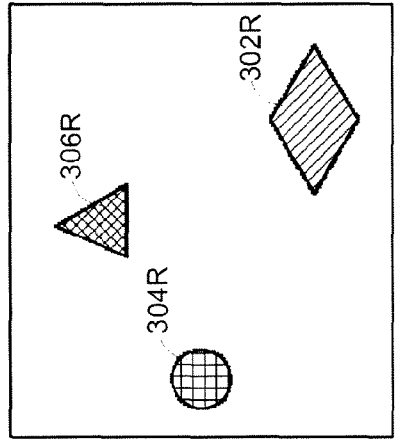
FIG. 6B
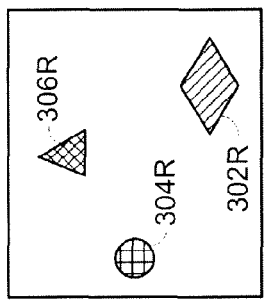
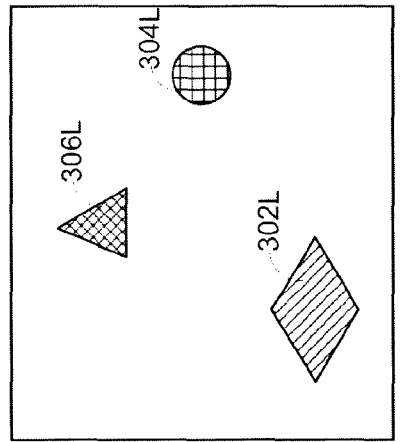
FIG. 6A
FIG. 6D

3D VIDEO CAMERA USING PLURAL LENSES AND SENSORS HAVING DIFFERENT RESOLUTIONS AND/OR QUALITIES

This application claims the benefit of Taiwan application Serial No. 100114159, filed Apr. 22, 2011, the subject matter of which is incorporated herein by reference.

BACKGROUND OF THE INVENTION

1. Field of the Invention

The invention relates in general to a three-dimensional (3D) video camera and associated control method, and more particularly, to a 3D video camera comprising a plurality of camera lenses of different grades and associated control method.

2. Description of the Related Art

As a result of the popularity of 3D movies, related products, such as 3D televisions, have begun to thrive. However, due to limited 3D video sources, image processing for converting 2D video to 3D video is emerging to increase the amount of 3D video content played by 3D televisions. Meanwhile, the amount of 3D video content is also expanding with the emergence of 3D video cameras and 3D cameras. A 3D camera is taken as an example in the description below, where the 3D camera may be a regular 3D camera or a 3D video camera.

A 3D camera according to the prior art employs two lenses of a same grade to record image data by simulating human eyes. FIG. 1 shows a schematic diagram of an image formation process of a conventional 3D camera. A left camera lens 120 comprises a left lens (L)122 and a left sensing element 124; a right camera lens 130 comprises a right lens (R)132 and a right sensing element 134. The left lens (L)122 forms an image of an object 100 on the left sensing element 124 and outputs a left sensing signal; whereas, the right lens (R)132 forms an image of the object 100 on the right sensing element 134 and outputs a right sensing signal.

A left 2D image processing circuit 126 processes the left sensing signal output by the left sensing element 124 to form a left eye image 128; a right 2D image processing circuit 136 processes the right sensing signal output by the right sensing element 134 to form a right eye image 138. A storage device (not shown) in the 3D camera then stores information of the left eye image 128 and the right eye image 138 to form a 3D video. The left eye image 128 and the right eye image 138 may be a single image or continuous images, and have a same resolution.

It can be seen from the above description that, the conventional 3D camera adopts two sets of camera lenses of an identical grade when generating the left eye image 128 and the right eye image 138, and utilizes individual image processing circuits to generate the left eye image 128 and the right image 138. It is to be noted that the left eye image 128 and the right eye image 138 do not affect each other during formation.

To playback a 3D video with a 3D television, a control circuit in the 3D television in sequence transmits the left eye image 128 to a left eye and the right eye image 138 to a right eye of a viewer; accordingly, the viewer may watch the 3D video.

A lens of a camera generally consists of a plurality of optical elements, and an amount of light that penetrates through the camera lens is controlled by a diaphragm. The sensing element may be a charge coupled device (CCD) or a complementary metal oxide semiconductor (CMOS) sensor. A sophistication of a lens and a resolution of a sensing element as well as an image formation capability are all indices of a grade of the lens, and a lens of a higher grade is naturally higher in cost. Therefore, a conventional 3D camera adopting two lenses of a same grade can be expensive.

SUMMARY OF THE INVENTION

The invention is directed to a 3D video camera and associated control method. By utilizing a 3D video camera comprising two lenses of different specifications (grades), two images of different qualities are generated and are combined to a left eye image and a right eye image of a same quality.

According to an embodiment of the present invention, a 3D video camera is provided. The 3D video camera comprises a first camera lens for providing a first sensing signal; a second camera lens for providing a sensing signal; and an image processing unit for receiving the first sensing signal and the second sensing signal to generate a first eye image and a comparison image, and generating 3D depth information according to the first eye image and the first comparison image.

According to another embodiment of the present invention, a method for controlling a 3D video camera is provided. The method comprises providing a first eye image according to a first sensing signal, providing a first comparison image according to a second sensing signal, and generating 3D depth information according to the first eye image and the first comparison image.

The above and other aspects of the invention will become better understood with regard to the following detailed description of the preferred but non-limiting embodiments. The following description is made with reference to the accompanying drawings.

BRIEF DESCRIPTION OF THE DRAWINGS

FIGS. 6a to 6e illustrate a control method according to an embodiment of the present invention.

DETAILED DESCRIPTION OF THE INVENTION

Figure 1:
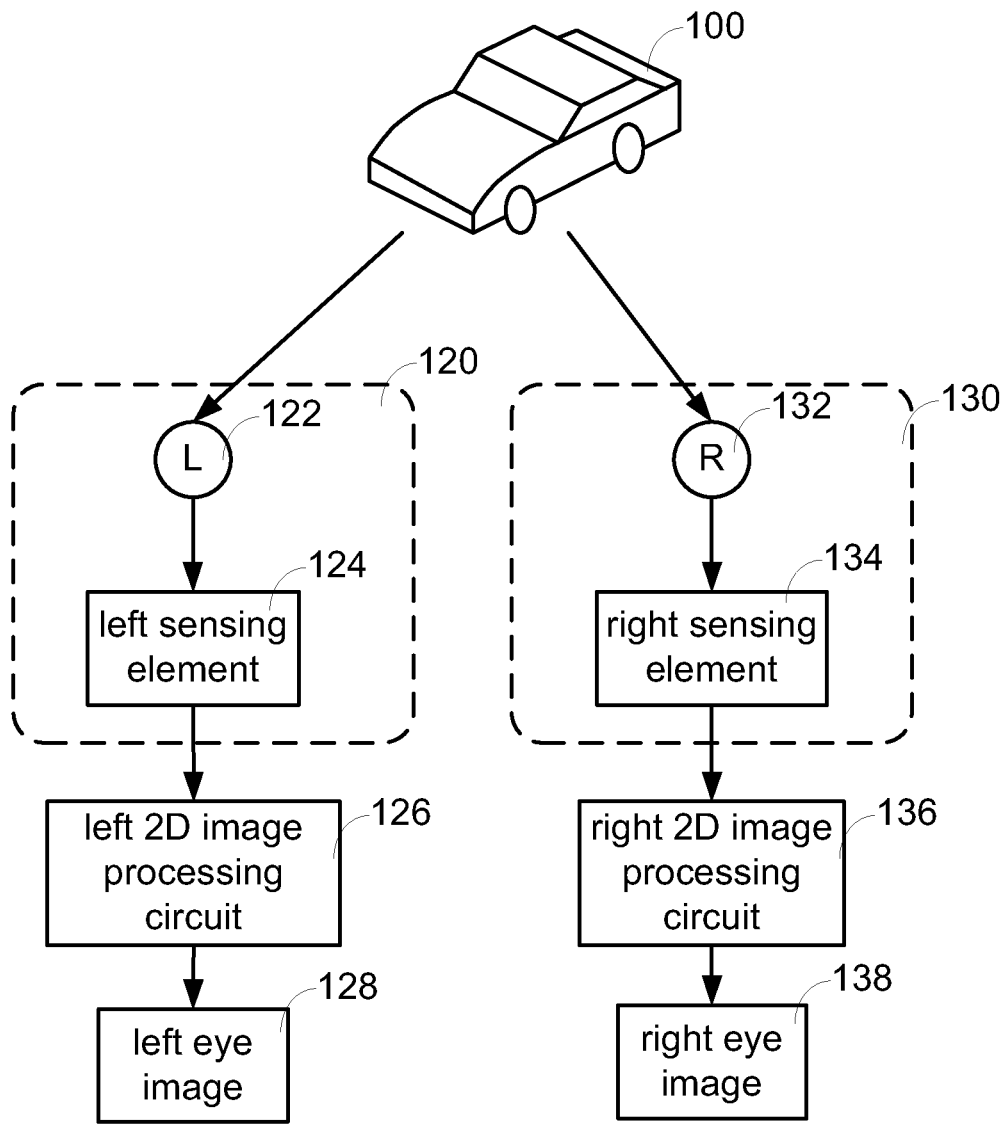
FIG. 1 is a schematic view of an image formation process of a conventional 3D video camera.
Figure 2A:
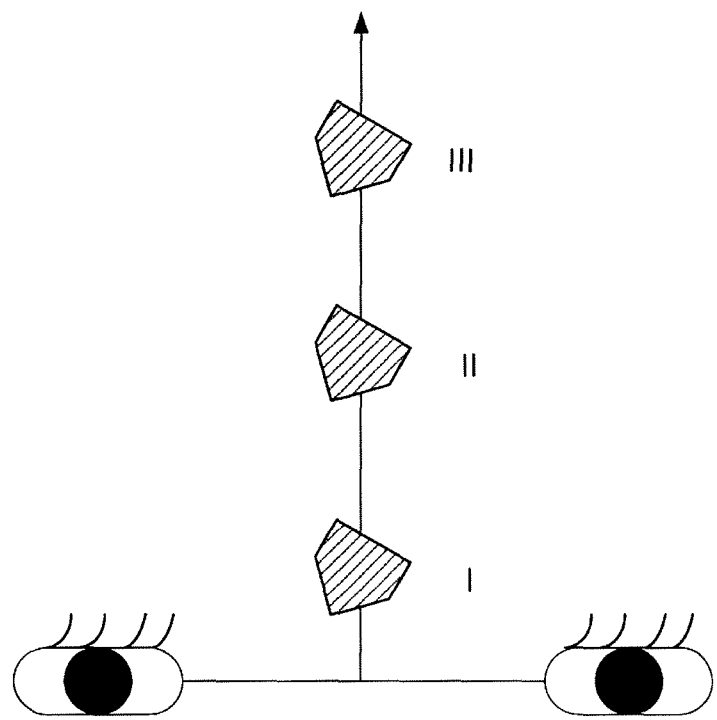
FIGS. 2a and 2b are schematic diagrams of image formation from respective eyes when an object is viewed by the eyes.
Figure 2B:
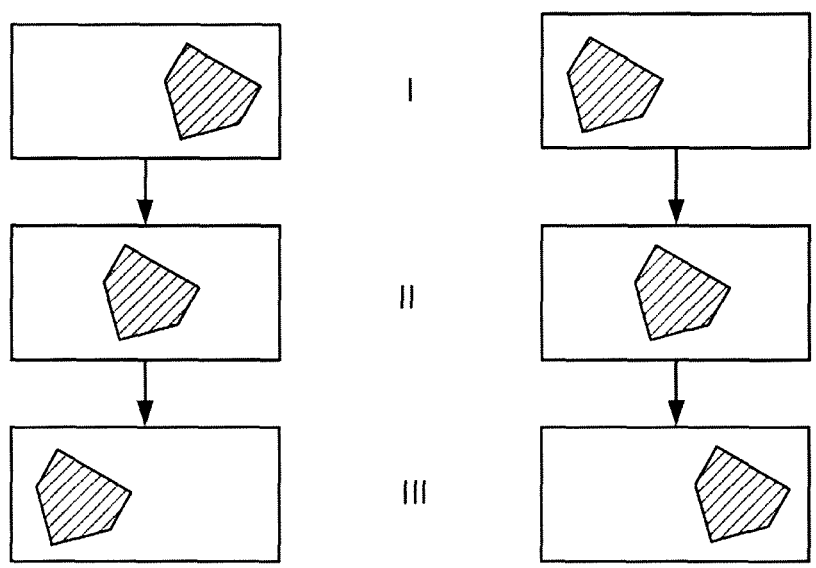

Certain differences exist between images presented in a left eye and a right eye when an object is perceived by the left eye and the right eye, and a human brain then establishes a three-dimensional (3D) image according to the images perceived by the both eyes. FIGS. 2a and 2b show schematic diagrams of image formation from respective eyes when an object is perceived by the both eyes.

When an object is closely located at a position I right in the front of the eyes, the object perceived by the left eye is located at a right side of the left-eye visual range, and the object perceived by the right eye is located at a left side of the right-eye visual range. As the object continues to move away from the eyes, the object perceived by the left and right eyes gradually move towards to the center. Supposing the image perceived by the left and right eyes are identical when the object is at a position II, i.e., the image is at the center, the position II is then regarded as a reference distance. As the object continues to move away from the eyes, the object perceived by the left eye becomes at a left side of the left-eye visual range, and the object perceived by the right eye becomes at a right side of the right-eye visual range.

Based on the abovementioned features, a concept of 3D depth is developed. FIGS. 3a, 3b, 3c, and 3d illustrate a method for determining a position of an object by utilizing images simultaneously perceived by the both eyes.

Figure 3A:
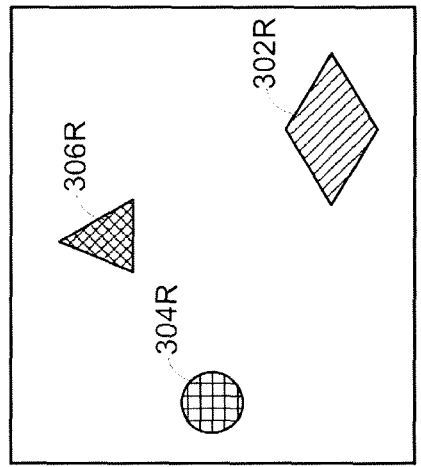
FIGS. 3a, 3b, 3c and 3d show a method for determining a position of an object by utilizing images simultaneously perceived by the both eyes.
Figure 3B:
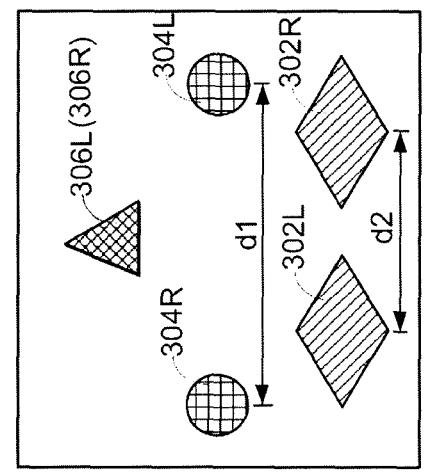
Figure 3C:
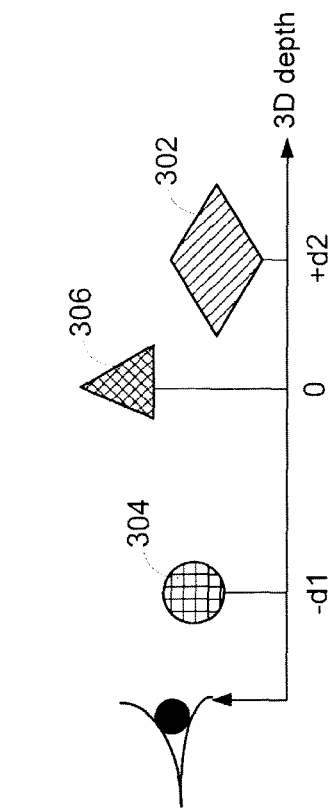

Suppose three objects in a left-eye visual range image are shown in FIG. 3a, with a rhombus 302L at the left, a circle 304L at the right and a triangle 306 in the middle. Also suppose three objects in a right-eye visual range image are as shown in FIG. 3b, with a rhombus 302R at the right, a circle 304R at the left and a triangle 306R in the middle. Accordingly, distance relationships between the three objects are shown in FIG. 3c; that is, a circle 304 is closest to the eyes, a triangle 306 is at the reference position, and a rhombus 302 is furthest from the eyes.

Figure 3D:
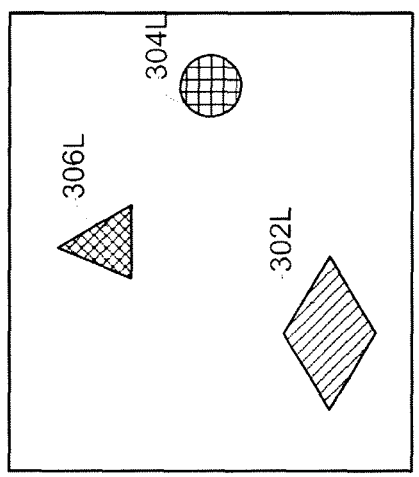

With reference to FIG. 3d, supposing the left-eye visual range image in FIG. 3a is defined as a reference image, a horizontal distance resulting from visual difference/visual range between same objects in the two images shown in FIGS. 3a and 3b is referred to as a 3D depth between the two images. It is observed that, a 3D depth of the triangle 306 is zero since the triangles 306L and 306R are located at the reference position; that is, the horizontal positions of the triangle 306 are the same in the left-eye and right-eye visual range images. Similarly, the circle 304L in the left-eye visual range image is at the right side and the circle 304R in the right-eye visual range image is at the left side, therefore, a 3D depth of the circle 304 is d1 of a negative value. Similarly, the rhombus 302L in the left-eye visual range image is at the left side and the rhombus 302R in the right-eye visual range image is at the right side, therefore, a 3D depth of the rhombus 302 is d2 of a positive value.

It is to be noted that, supposing the right-eye visual range image in FIG. 3b is defined as the reference image, a 3D depth of an object located near the eyes is a positive value, whereas a 3D depth of an object located away from the object is a negative value.

Images of video with 3D visual effects are formed by the above 3D depth concept. Therefore, the 3D video camera and associated control method of the present invention is realized by implementing the above 3D depth concept.

Figure 4:
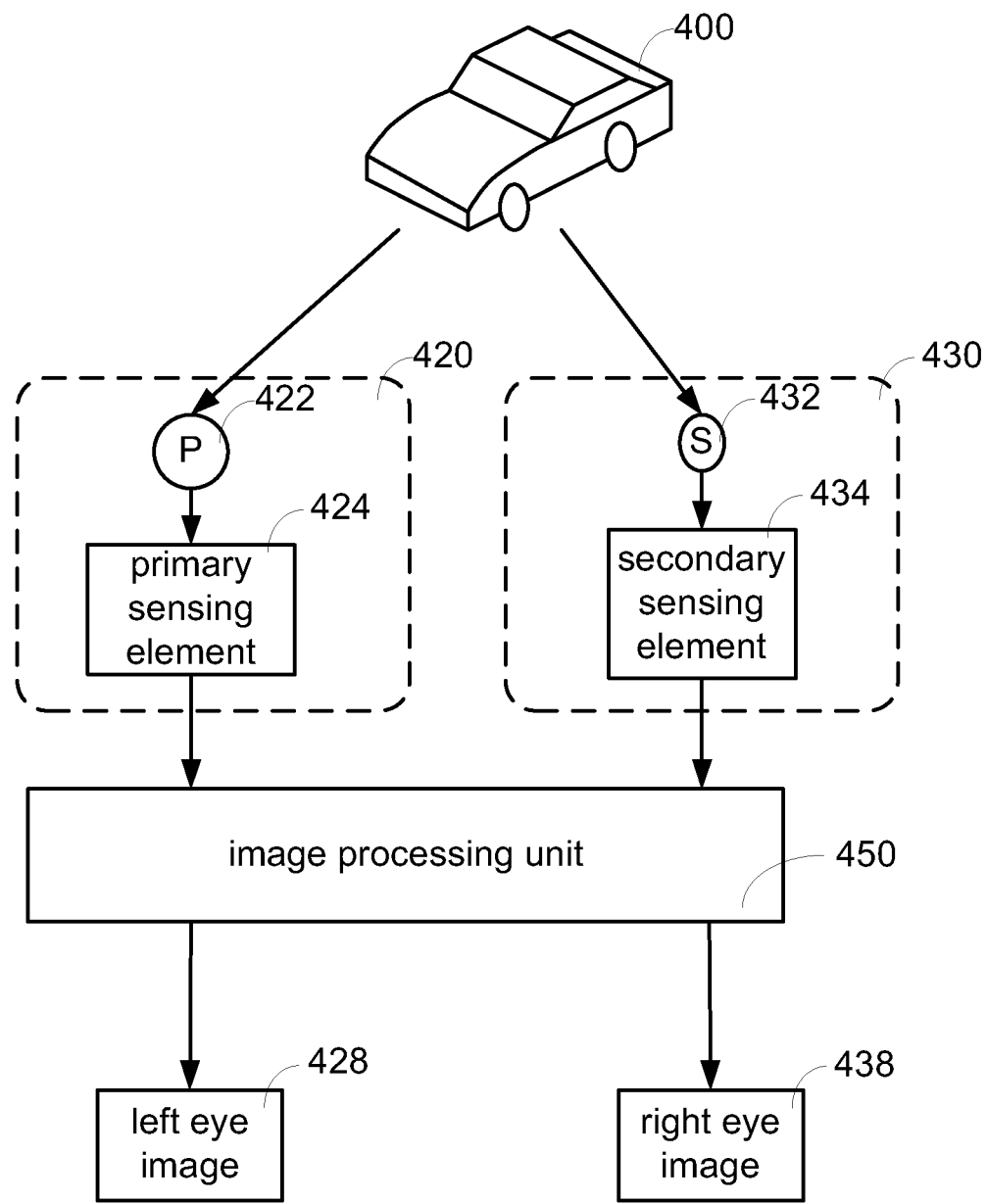
FIG. 4 is a schematic diagram of a 3D video camera according to an embodiment of the present invention.

FIG. 4 shows a schematic diagram of a 3D video camera according to an embodiment of the present invention. Two camera lenses 420 and 430 of the 3D video camera are of different specifications. For example, a left camera lens being a primary camera lens 420 is higher in grade, while a left camera lens being a secondary camera lens 430 is lower in grade. In this embodiment, a lower grade camera lens has a lower resolution and thus forms smaller images, images with a less satisfactory quality, or mono-color images; however, the lower grade camera lens has an advantage of being low in cost.

The primary camera lens 420 comprises a primary lens (P)422 and a primary sensing element 424; the right camera lens 430 comprises a secondary lens (S)432 and a second sensing element 434. The primary lens (P)422 forms an image of an object 400 on the primary sensing element 434 to output a primary sensing signal. The secondary lens (S)432 forms an image of the object 400 on the secondary sensing element 434 to output a secondary sensing signal.

According to the embodiment of the present invention, the left camera lens is the primary camera lens 420 and the right camera lens is the secondary camera lens 430. An image processing unit 450 receives the primary sensing signal and the secondary sensing signal, and generates a left-eye image 428 as a reference image according to the primary sensing signal and a first comparison image according to the secondary sensing signal. Thus, the first comparison image has a lower resolution compared to that of the reference image and therefore also has a smaller image size. Furthermore, to obtain a preferred position comparison basis, scaling is performed on the first comparison image to obtain a second comparison image of the same size as that of the reference image. 3D depth information is then obtained according to the second comparison image and the reference image, and a right-eye image 438 is reconstructed according to the reference image and the 3D depth information.

Due to the differences between specifications or quality of the images formed by the secondary camera lens 430 and that of the reference image generated by the primary camera lens 420, the first comparison image or the second comparison image is merely adopted for comparison with the reference image (the left-eye image 428) to obtain the 3D depth information. Upon obtaining the 3D depth information, the image processing circuit 450 reconstructs the right-eye image 438 according to the reference image (the left-eye image 428) of a preferred quality. As a result, the reconstructed right-eye image 438 is combined with the original left-eye image 428 to provide a view with a clear 3D image.

Figure 5:
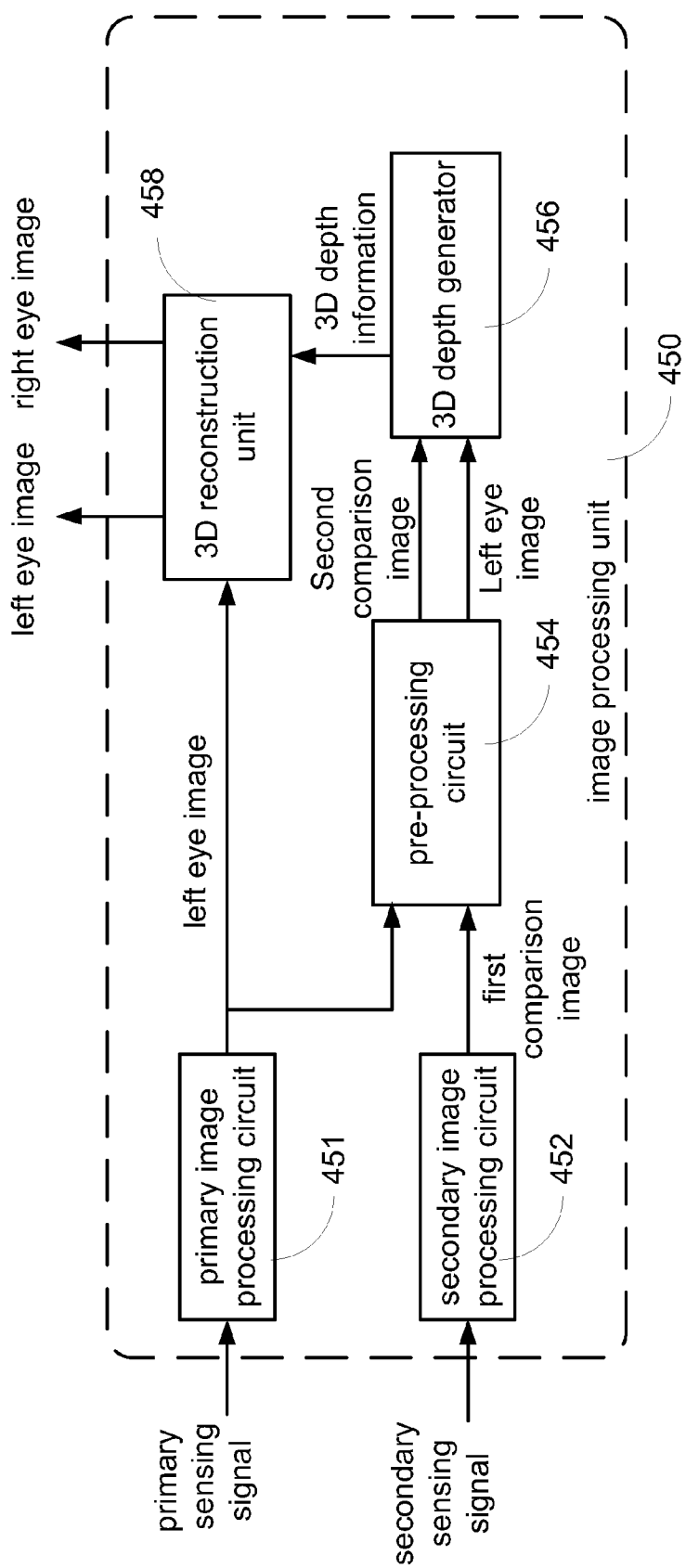
FIG. 5 is a schematic diagram of an image processing unit according to an embodiment of the present invention.

FIG. 5 shows a schematic diagram of an image processing unit according to another embodiment of the present invention. An image processing unit 450 comprises a primary image processing circuit 451, a secondary image processing circuit 452, a pre-processing circuit 454, a 3D depth generator 456, and a 3D reconstruction unit 458. In this embodiment, the left camera lens is the primary camera lens 420, and the right camera lens is the secondary camera lens 430. The primary image processing circuit 451 receives a primary sensing signal as a left-eye image and also as a reference image. The secondary (right) image processing circuit 452 receives a right sensing signal as a first comparison image. The pre-processing circuit 454 scales up the first comparison image according to a size of the left-eye image to form a second comparison image, such that the second comparison image has the same size as that of the left-eye image (reference image) 428.

The 3D depth generator 456 receives the second comparison image and the left-eye image (reference image) of the same size, and calculates 3D depth information to be transmitted to the reconstruction unit 458. The 3D reconstruction unit 458 then reconstructs the right-eye image according to the left-eye image (reference image) and the 3D depth information, and outputs the left-eye image and the right-eye image.

FIGS. 6a to 6e illustrate a control method according to an embodiment of the present invention. As shown in FIG. 6a, a left-eye image generated by the primary image processing circuit 451 has a high resolution and a high quality, and serves as a reference image. The rhombus 302L is at the left side, the circle 304L is at the right side, and the triangle 306L is in the middle. A first comparison image in FIG. 6b is generated by the secondary image processing circuit 452 and may have a lower resolution. In the first comparison image, the rhombus 302R is at the right side, the circle 304R is at the left side, and the triangle 306R is in the middle.

The pre-processing circuit 454 up-scales the first comparison image to a second comparison image shown in FIG. 6c according to a size of the left-eye image, such that the second comparison image has the same size as that of the left-eye image. Obviously, since the second comparison image is formed by scaling the first comparison image, the second comparison image has different specifications and quality from those of the left-eye image, and is hence not directly used as the right-eye image.

Subsequently, the 3D depth generator 456 compares distances between the objects in the left-eye image and the second comparison image, so as to generate 3D depth information as shown in FIG. 6d.

Finally, the 3D reconstruction unit 458 reconstructs the right-eye image mainly by the left-eye image and the 3D depth information. As shown in FIG. 6e, the circle 304L in the left-eye image is moved to the left by a distance d1 to become a circle 304R' in the right-eye image, the rhombus 302L in the left-eye image is moved to the right by a distance d2 to become a rhombus 302R' in the right-eye image, and the triangle 306L in the left-eye image becomes a triangle 306R' in the right-eye image without moving.

It is observed that, due to the high quality of the left-eye image, the right-eye image formed by moving the objects in the left-eye image according to the 3D depth also has the same high quality and high resolution as the left-eye image.

Figure 7:
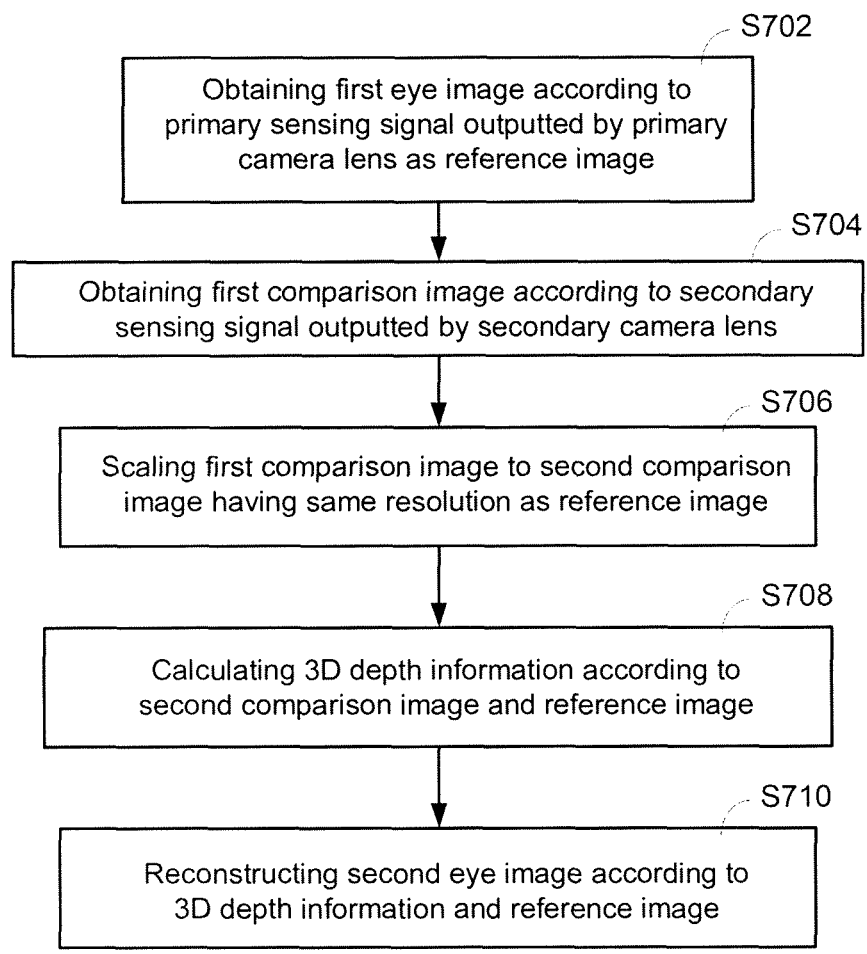
FIG. 7 is a flowchart of a control method for 3D video according to an embodiment of the present invention.

FIG. 7 shows a flowchart of a method for controlling 3D image according to an embodiment of the present invention. In Step S702, a first eye image is obtained to serve as a reference image according to a primary sensing signal outputted by a primary camera lens. In Step S704, a first comparison image is obtained according to a secondary sensing signal output by a secondary camera lens. In Step 706, the first comparison image is scaled to form a second comparison image such that the second comparison image has the same size as that of the reference image. In Step S708, 3D depth information is calculated according to the second comparison image and the reference image. In Step S710, a second eye image is reconstructed according to the 3D depth information and the reference image.

In the above embodiment, since the objects in the left-eye image (reference image) and the second comparison image are rather simple, the 3D depth generator 456 obtains the 3D depth by comparing distances between the objects.

A calculation approach for the 3D depth generator 456 to generate the 3D depth is described as follows. The 3D depth generator 456 respectively divides the left-eye image (reference image) and the second comparison image into a plurality of blocks, with each of the blocks of the left-eye image respectively corresponding to one of the blocks of the second comparison image, and vice versa. The 3D depth generator 456 then compares (e.g., by distance calculation) the corresponding blocks in the left-eye image and the second comparison image to respectively provide a block base 3D depth as the 3D depth information. In another embodiment, more refined sub-block base 3D depths are obtained by interpolation according to the block base 3D depths, so as to serve as the final 3D depth information. It is to be noted that, a smallest block unit is a pixel. More specifically, the 3D depth of each pixel can be obtained by interpolation, such that the 3D reconstruction unit is able to provide a high-quality and high-resolution right-eye image according the left-eye image (reference image) and the pixel base 3D depth of each pixel.

Figure 8:
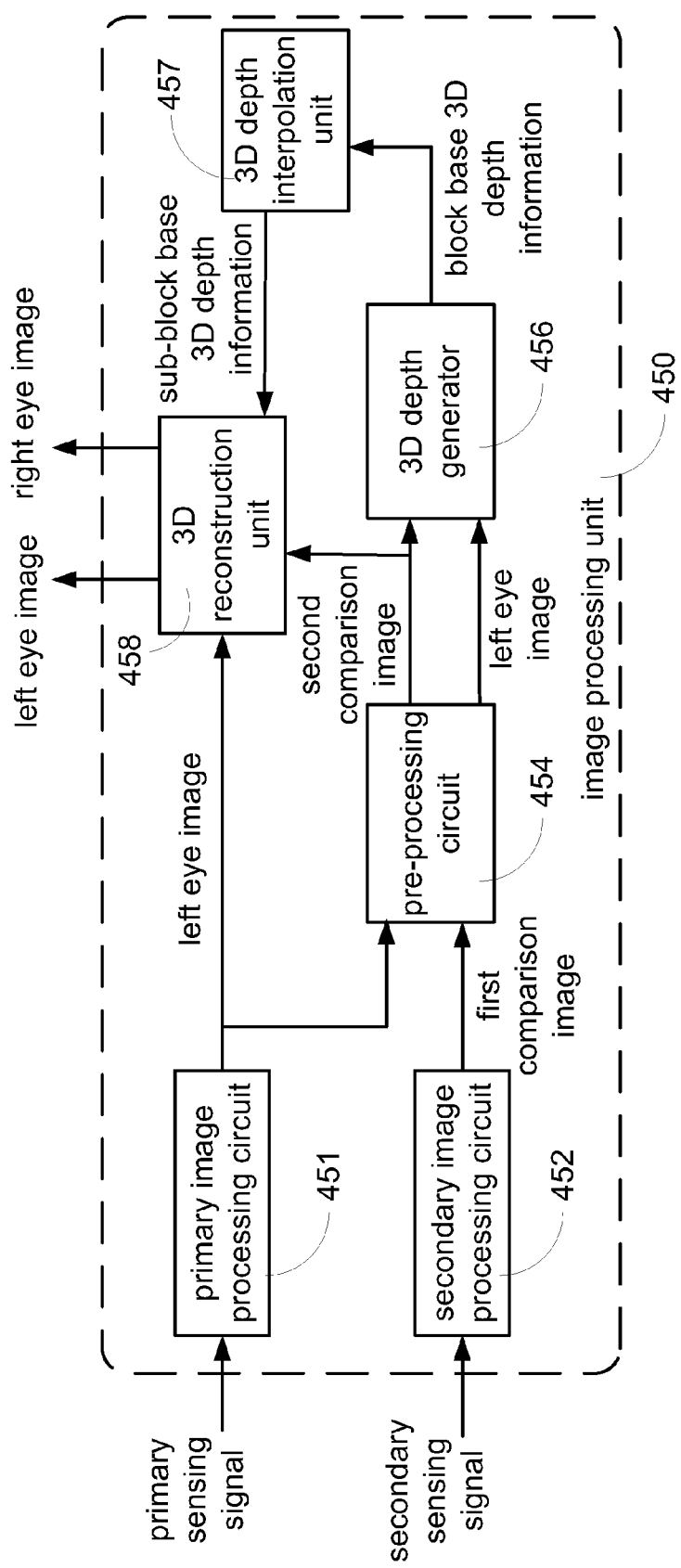
FIG. 8 is a schematic diagram of an image processing unit according to another embodiment of the present invention.

FIG. 8 shows a schematic diagram of an image processing circuit according to another embodiment of the present invention. A difference between this embodiment and the previous embodiment is that, a 3D depth interpolation unit 457 is included in this embodiment to receive block 3D depth information output by the 3D depth generator and to output the sub-block base 3D depth information to the 3D reconstruction unit.

In practice, certain areas cannot be simultaneously perceived by both eyes when a single object is observed by both eyes. As shown in FIG. 8, the 3D reconstruction unit 458 may further receive the second comparison image, from which a small area that cannot be restored from the left-eye image is captured to complete the reconstruction. However, the small area is unlikely to be noticed even when the reconstruction is not performed by the 3D reconstruction unit.

It can be seen from the above description that, the present invention can be applied to a 3D video camera comprising a primary camera lens and a secondary camera lens to reconstruct a left-eye image and a right-eye image of the same quality and resolution by utilizing lenses of different grades, thereby reducing the cost of 3D cameras. Alternatively, a 3D video may also be formed by a high-value single lens reflex (SLR) video camera and a common SLR video camera.

Various modifications may be made to embodiments of the present invention. For example, the pre-processing circuit may scale the left-eye image (reference image) so that the scaled reference image is in the same size as that of the image outputted by the secondary camera lens. Therefore, the 3D depth generator may accordingly generate the 3D depth information, and the 3D reconstruction unit may reconstruct another eye image according to the down-scaled reference image and the 3D depth information.

Furthermore, the present invention may also employ a lens with a same resolution but different optical characteristics as the secondary camera lens. As an example, a monochromatic lens with a same resolution is utilized as the secondary camera lens. Thus, the present invention further eliminates the pre-processing circuit, such that the 3D depth generator is directly applied to receive the images output by the primary camera lens and the secondary camera lens without scaling the image output by the secondary camera lens in advance. Since image resolutions output by the primary camera lens and the secondary camera lens are the same, the 3D depth generator may directly compare the left-eye image with the first comparison image to output the 3D depth information. Alternatively, by utilizing a lens with the same resolution as the secondary camera lens, a first image outputted by the secondary camera lens is decolorized by the pre-processing circuit. The 3D depth generator then receives the first eye image and the decolorized first comparison image to output the 3D depth information. Accordingly, in an embodiment of a primary camera lens and a secondary camera lens with the same resolution, the smallest block unit of a block base 3D depth, generated by the 3D depth generator according to the second comparison image and the first eye image, is a pixel.

Furthermore, the capability for reconstructing the left-eye image may be optional in the 3D video camera of the present invention. That is, the 3D video camera may only store the left-eye image (reference image) and the 3D depth information. When performing 3D video playback, the 3D video camera only needs to output the left-eye image (reference image) and the 3D depth information to an external playback unit (e.g., a 3D television). When the external playback unit is equipped with a 3D reconstruction unit, the right-eye image may be reconstructed according to the left-eye image (reference image) and the 3D depth information, so as to in sequence present the left-eye image and the right-eye image on a screen.

It is also observed from the above descriptions that, the 3D depth information may also be utilized to determine a distance parameter between the object and the video camera. More specifically, distance detection between the object and the video camera may be performed with two camera lenses—such an approach may be further applied to motion detection for game consoles.

Figure 9:
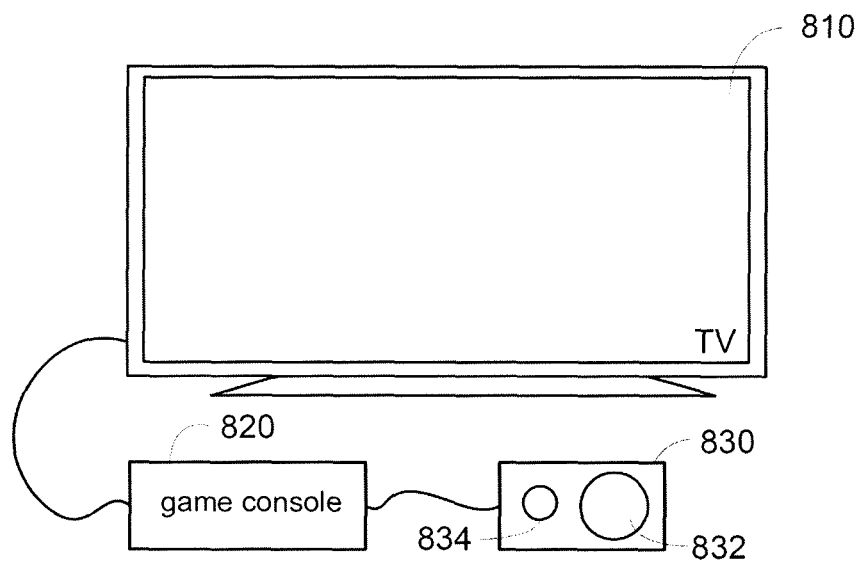
FIG. 9 is a schematic diagram of a body controlled game system implementing the present invention.

FIG. 9 shows a body controlled game system implementing the present invention. The body controlled game system comprises a game console 820 and a body detection unit 830. The body detection unit 830 comprises a primary camera lens 832 and a secondary camera lens 834. The body detection unit 830 captures an image of a user 850, and accordingly establishes 3D depth information to obtain a distance between a user position and the body detection unit. During the games, the primary camera lens 832 captures user images that can be displayed on a television or shared with friends.

3D depth information is further generated by the images generated by the primary camera lens 832 and the secondary camera lens 834 and transmitted to the game console 820. When any of the limbs of the user is in motion, the 3D depth information of associated positions changes correspondingly. Therefore, the game console 820 transforms the change in the 3D depth information into a control signal, so as to generate corresponding frames on a television 810.

Alternatively, the body detection unit 830 may serve as a gesture controlled input device of the television. Distances between vehicles, aircrafts, vessels, robots and neighboring objects can all be detected by the body detection unit 830.

Figure 10:
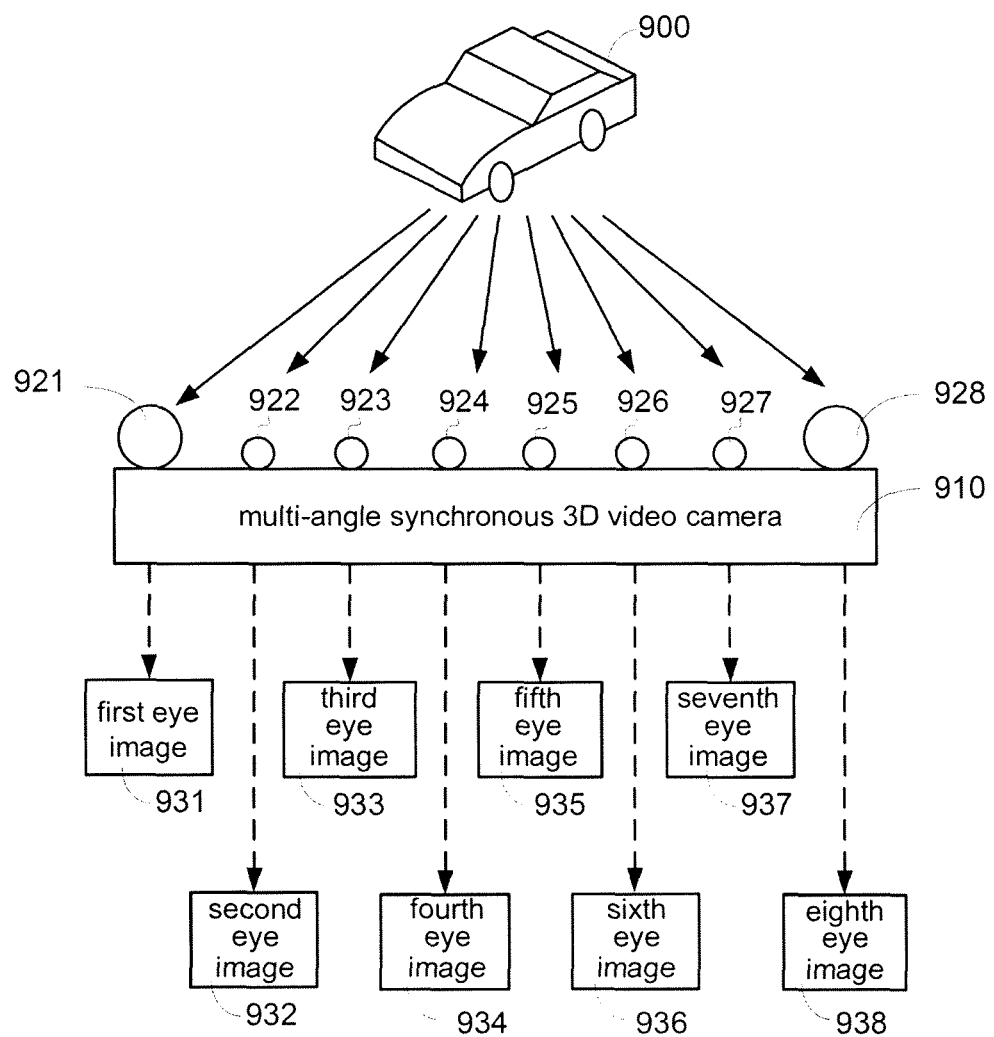
FIG. 10 is a schematic diagram of a multi-angle synchronous 3D video camera.

Furthermore, the present invention may be applied to realize a multi-angle synchronous 3D video camera. FIG. 10 shows a schematic diagram of a multi-angle synchronous 3D video camera 910 comprising two primary camera lenses 921 and 928 and six secondary camera lenses 923 to 927 for capturing an object 900.

A first eye image 931 is directly generated by the first primary camera lens 921, and an eighth eye image 938 is directly generated by the second primary camera lens 928. A plurality of comparison images are generated by the secondary camera lenses 922 to 927. Based on the image processing technique of the present invention, a second eye image 932, a third eye image 933, a fourth eye image 934, a fifth eye image 935, a sixth eye image 936 and a seventh eye image 937 are generated according to the first eye image 931 or the eighth eye image 938.

The first eye image 931 to the eighth eye image 938 received by the television are divided into seven dual-eye image groups, which are, from left to right, a first dual-eye image group comprising the first eye image 931 and the second eye image 932, a second dual-eye image group comprising the second eye image 932 and the third eye image 933, a third dual-eye image group comprising the third eye image 933 and the fourth eye image 934, a fourth dual-eye image group comprising the fourth eye image 934 and the fifth eye image 935, a fifth dual-eye image group comprising the fifth eye image 935 and the sixth eye image 936, a sixth dual-eye image group comprising the sixth eye image 936 and the seventh eye image 937, and a seventh dual-eye image group comprising the seventh eye image 937 and the eighth eye image 938.

Accordingly, supposing seven users are lined up from left to right in front of the television, the television is capable of providing the seven dual-eye image groups to correspondingly the seven users, such that each user is able to perceive the object 900 at different angles.

It is to be noted that the number of primary camera lenses in the multi-angle synchronous 3D video camera 910 is not limited. For example, the multi-angle synchronous 3D video camera 910 may also be realized by one primary camera lens and several secondary camera lenses.

Figure 11:
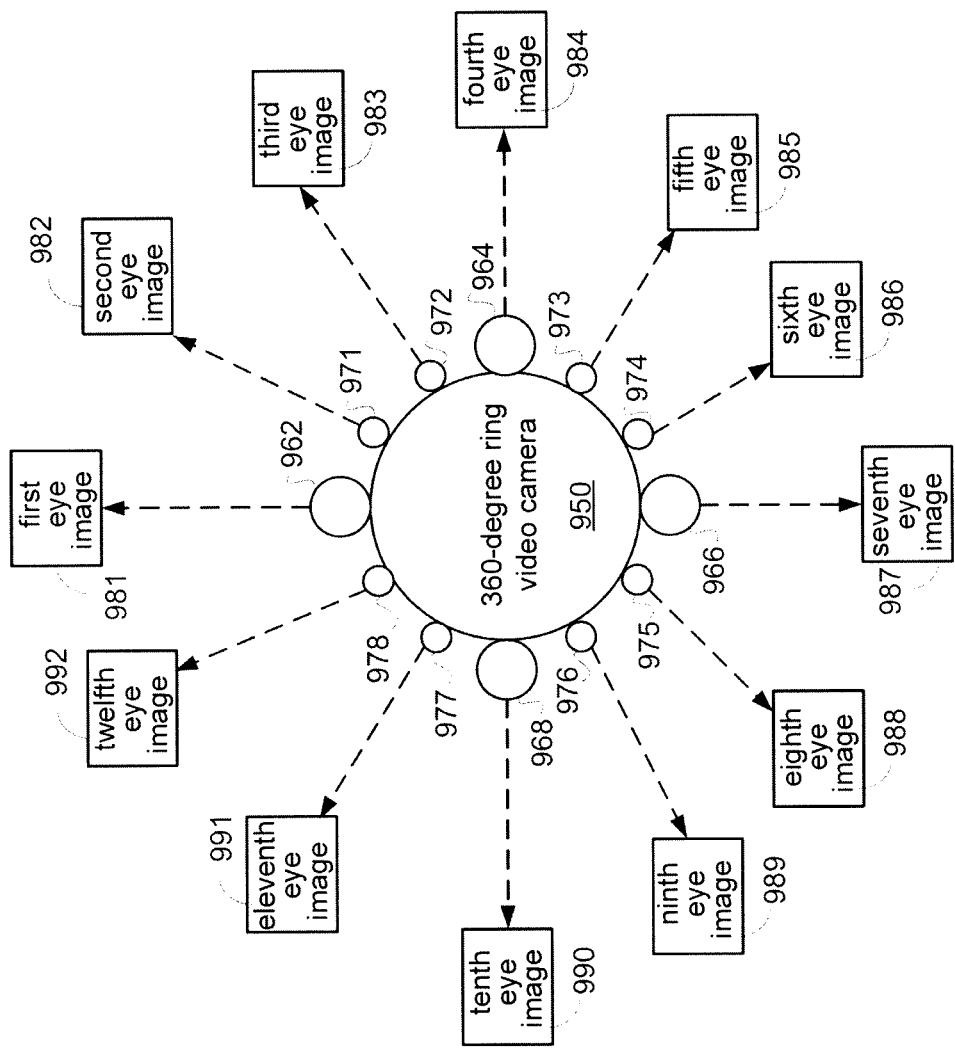
FIG. 11 is a schematic diagram of a 360-degree ring video camera.

The present invention may further realize a 360-degree ring video camera. FIG. 11 shows a schematic diagram of a 360-degree ring video camera 950 comprising four primary camera lenses 962 to 968 and eight secondary camera lenses 971 to 978 for simultaneously capturing 360-degree panoramic images.

With the same principles described above, a first eye image 981 is directly generated by the first primary camera lens 962, a fourth eye image 984 is directly generated by the second primary camera lens 964, a seventh eye image 987 is directly generated by the third primary camera lens 966, and a tenth eye image 990 is directly generated by the fourth primary camera lens 968. Next, a plurality of corresponding comparison images are generated by the secondary camera lenses 971 to 978. Based on the image processing technique of the present invention, a second eye image 982, a third eye image 983, a fifth eye image 985, a sixth eye image 986, an eighth eye image 988, a ninth eye image 989, an eleventh eye image 991 and a twelfth eye image 992 are generated according to the first eye image 981, the fourth eye image 984, the seventh eye image 987 or the tenth eye image 990.

Thus, a 360-degree panoramic image may be played according to the first image 981 to the twelfth image 992.

It is an advantage of the present invention to provide a 3D video camera and associated control method. With a 3D video camera comprising two camera lenses of different specifications (grades), two images of different qualities are generated and combined to form a left-eye image and a right-eye image of the same quality, so as to provide 3D video.

While the invention has been described by way of example and in terms of the preferred embodiment(s), it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A three-dimensional (3D) video camera, comprising:
   a first camera lens configured to provide a first sensing signal by a first sensing element;
   a second camera lens configured to provide a second sensing signal by a second sensing element, wherein the first camera lens and the second camera lens have different resolutions; and
   an image processing unit configured to receive the first sensing signal and the second sensing signal to generate a first eye image and a first comparison image, and to generate 3D depth information according to the first eye image and the first comparison image,
   wherein the image processing unit is configured to process the first comparison image with reference to the first eye image to obtain a second comparison image, and generate the 3D depth information by comparing the first eye image and the second comparison image to calculate horizontal distances between same objects in the first eye image and the second comparison image resulting from visual differences between the same objects in the first eye image and the second comparison image, wherein the calculated horizontal distances represent the 3D depth information;

wherein the first comparison image is processed with scaling or decolorizing before the horizontal distances representative of 3D depth information are calculated according to the first eye image and the first comparison image; and wherein the image processing unit comprises:
- a first image processing circuit configured to receive the first sensing signal to generate the first eye image;
- a second image processing circuit configured to receive the second sensing signal to generate the first comparison image;
- a pre-processing circuit configured to receive the first eye image and the first comparison image to generate the second comparison image; and
- a 3D depth generator configured to receive and compare the second comparison image and the first eye image to generate a block base 3D depth as the 3D depth information by dividing the second comparison image and the first eye image into a plurality of blocks, with each of the blocks of the first eye image respectively corresponding to one of the blocks of the second comparison image, and vice versa, and comparing the corresponding blocks in the first-eye image and the second comparison image based on a distance calculation to respectively provide the block base 3D depth as the 3D depth information; and
- a 3D video camera further comprises a 3D depth interpolation unit configured to receive the block base 3D depth and perform an interpolation to obtain a sub-block base 3D depth as the 3D depth information.

2. The 3D video camera according to claim 1, wherein the image processing unit is further configured to generate a second eye image according to the first eye image and the 3D depth information.

3. The 3D video camera according to claim 2, further comprising a third camera lens configured to generate a third comparison image, wherein the image processing unit is configured to generate a third eye image according to the third comparison image.

4. The 3D video camera according to claim 3, wherein the 3D video camera is a multi-angle synchronous 3D video camera or a 360-degree ring video camera.

5. The 3D video camera according to claim 2, wherein the image processing unit further comprises:
- a 3D reconstruction unit configured to receive the first eye image and the 3D depth information to generate the second eye image.

6. The 3D video camera according to claim 1, wherein the block base 3D depth is 3D depth information in a unit of a pixel.

7. The 3D video camera according to claim 1, wherein the image processing unit is configured to calculate the horizontal distance by:
- calculating a horizontal distance of zero between same objects representative of an object positioned at a reference position with respect to the 3D video camera;
- calculating a positive horizontal distance between the same objects representative of the object if the object is farther away from the 3D video camera than the reference position; and
- calculating a negative horizontal distance between the same objects representative of the object if the object is closer to the 3D video camera than the reference object.

8. The 3D video camera according to claim 1, wherein the 3D video camera is a multi-angle synchronous 3D video camera or a 360-degree ring video camera.

9. The 3D video camera according to claim 1, wherein the second camera lens has a lower grade than the first camera lens so as to form images of lower resolution and lesser quality than the first camera lens.

10. A method for controlling a 3D video camera, comprising:
- obtaining a first eye image according to a first sensing signal provided by a first sensing element coupled with a first camera lens;
- obtaining a first comparison image according to a second sensing signal provided by a second sensing element coupled with a second camera lens, wherein the first camera lens and the second camera lens have different resolutions;
- processing the first comparison image with reference to the first eye image to obtain a second comparison image;
- processing the first comparison image with scaling or decolorizing; then
- generating 3D depth information by comparing the first eye image and the second comparison image to calculate horizontal distances between same objects in the first eye image and the second comparison image resulting from visual differences between the same objects in the first eye image and the second comparison image, wherein the calculated horizontal distances represent the 3D depth information, wherein the generating the 3D depth information comprises dividing the second comparison image into a plurality of comparison blocks, dividing the first eye image into a plurality of first blocks, and comparing distances between the comparison blocks and the corresponding first blocks to obtain a block base 3D depth as the 3D depth information; and
- performing an interpolation on the block base 3D depth to obtain a sub-block base 3D depth as the 3D depth information.

11. The method according to claim 10, further comprising generating a second eye image according to the first eye image and the 3D depth information.

12. The method according to claim 10, further comprising:
- obtaining a third comparison image according to a third camera lens; and
- obtaining a third eye image according to the third comparison image and the first eye image.

13. The method according to claim 12, wherein the 3D video camera is a multi-angle synchronous 3D video camera or a 360-degree ring video camera.

14. The method according to claim 10, wherein the 3D video camera is a body detection unit for outputting the 3D depth information and a reference signal to a game console, and the game console transforms a change in the 3D depth information into a control signal to generate a corresponding image on a television.

* * * * *